United States Patent
Jackson et al.

(10) Patent No.: US 8,326,573 B2
(45) Date of Patent: Dec. 4, 2012

(54) METHOD FOR CHARACTERISING THE PROFILE OF A SURFACE

(75) Inventors: Andrew D Jackson, Derby (GB); Peter I Wright, Derby (GB); Michael A Howard, Derby (GB); Robert J Stafford, West Hallam (GB)

(73) Assignee: Rolls-Royce PLC, London (GB)

( * ) Notice: Subject to any disclaimer, the term of this patent is extended or adjusted under 35 U.S.C. 154(b) by 281 days.

(21) Appl. No.: 12/310,195

(22) PCT Filed: Jun. 21, 2007

(86) PCT No.: PCT/GB2007/002307
§ 371 (c)(1),
(2), (4) Date: Apr. 2, 2009

(87) PCT Pub. No.: WO2008/009878
PCT Pub. Date: Jan. 24, 2008

(65) Prior Publication Data
US 2009/0319224 A1    Dec. 24, 2009

(30) Foreign Application Priority Data
Jul. 20, 2006  (GB) .................................... 0614423.2

(51) Int. Cl.
*G01B 7/28* (2006.01)
(52) U.S. Cl. ........................................................ 702/167
(58) Field of Classification Search .................... 702/167
See application file for complete search history.

(56) References Cited

U.S. PATENT DOCUMENTS

| | | | |
|---|---|---|---|
| 4,908,782 A * | 3/1990 | Pekarek et al. | 702/167 |
| 5,521,847 A * | 5/1996 | Ostrowski et al. | 702/152 |
| 6,212,481 B1 * | 4/2001 | Kume | 702/167 |
| 6,711,530 B1 * | 3/2004 | Kase | 703/2 |
| 7,207,772 B2 | 4/2007 | Johann | |
| 2001/0029679 A1 * | 10/2001 | Peters | 33/561.3 |
| 2003/0188445 A1 * | 10/2003 | Kadowaki et al. | 33/10 |
| 2005/0106998 A1 * | 5/2005 | Lin et al. | 451/5 |
| 2005/0165578 A1 * | 7/2005 | Gorsch et al. | 702/167 |
| 2007/0050172 A1 * | 3/2007 | Frost et al. | 702/156 |

FOREIGN PATENT DOCUMENTS
EP    1 580 399 A1    9/2005

\* cited by examiner

*Primary Examiner* — Timothy Thompson
*Assistant Examiner* — Rhadames J Alonzo Miller
(74) *Attorney, Agent, or Firm* — Oliff & Berridge, PLC

(57) ABSTRACT

A method for characterising the surface profile of a component comprises the steps of a) dividing the surface into at least two regions; b) for each region, measuring the surface and selecting a number of measured points to define a co-ordinate dataset for the region; c) for each region, applying a curve-fitting algorithm to the dataset for the region to define the surface profile of the region; d) combining the defined surface profiles for the regions to produce a defined surface profile for the aerofoil surface. The characterization may be used in the design, analysis and manufacturing steps of product development, thereby decreasing the total time and work required.

13 Claims, 2 Drawing Sheets

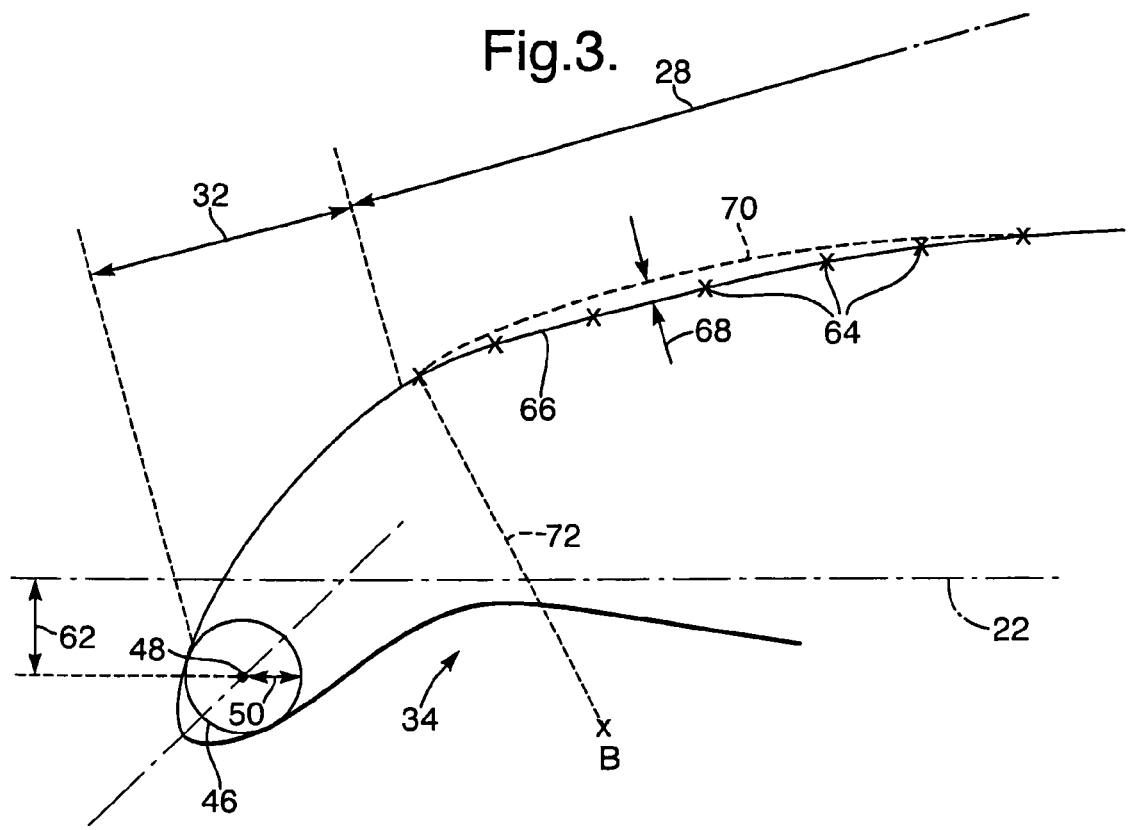

METHOD FOR CHARACTERISING THE PROFILE OF A SURFACE

This invention relates to the measurement and characterisation of the surfaces of components. The method is particularly suited to the characterisation of the surface profiles of aerofoils for gas turbine engines.

In a gas turbine engine, each of the rotor blades and stator vanes is of aerofoil cross-section shape and must conform with its intended design, within certain limits of acceptability. For example, each aerofoil has a leading edge designed with a complex geometry to deliver a specific effect. Deviations from the optimum design may result in undesirable reductions in performance, such as aerodynamic stall, compressor surge or reduction in engine efficiency. In some circumstances, relatively small deviations may have significant effects on performance. A similar but different complex geometry governs the definition of the trailing edge of an aerofoil.

The design methodology for rotor blades and stator vanes is driven primarily by the aerodynamic performance requirements of the compressor or turbine in which they are to operate. However, other requirements must also be taken into account. The mechanical behaviour of the components must be acceptable, and so stress and thermal analyses must be performed to determine the stress levels and deflections. The components must, ultimately, be able to be manufactured using the available machines and processes. One of the challenges in designing such components is the need to reconcile these different and often contradictory requirements, and in particular to characterise the aerofoil profile in a form that can be used both by stress and thermal analysis software and by manufacturing tools.

It is desirable to reduce the time for development of a new aerofoil design to the point of producing a saleable product. A tool that reduces the design, analysis and manufacturing time is therefore desirable.

It is desirable to characterise the surface profile of the aerofoil in a form that can be used directly at all stages of the design and development. A tool that permits a single characterisation of a surface profile to be used by all of the design system, the analysis systems and the manufacturing systems is therefore desirable.

Past approaches to the design of leading edges have used a number of different profiles. Circular leading edges are robust but inflexible, and the high curvature changes cause aerodynamic losses. Using a closed curve fit tends to lead to excessive material removal during manufacture, and the "snubbing" of the leading edge. Elliptical leading edges are better, but are more difficult to implement, and lack subtle control and flexibility. A free-form leading edge has the maximum flexibility, but is difficult to control and to systemise.

Known methods of defining aerofoil profiles rely either on prescribed geometry (such as ellipses), which reduces flexibility, or on the definition of many discrete points, which is difficult to control and (for example, in stress analysis) leads to very complex—and therefore slow—analysis. Previous methods of assessment do not take full account of the relative importance of the region of the aerofoil near to the edges, compared with the regions further away. This is particularly important when the edge is not designed to be circular.

It is therefore an object of the invention to provide a method for characterising the profile of a surface of a component which avoids the disadvantages of known methods and allows both freedom and control.

According to the invention there is provided a method for characterising the profile of a surface of a component as claimed in claim 1, and a method for characterising the profile of a surface of an aerofoil as claimed in claim 18.

The invention will now be described, by way of example only, with reference to the accompanying drawings in which:

FIG. 3 is a plan view of the leading edge and part of the suction surface of an aerofoil of alternative design.

Figure 1:
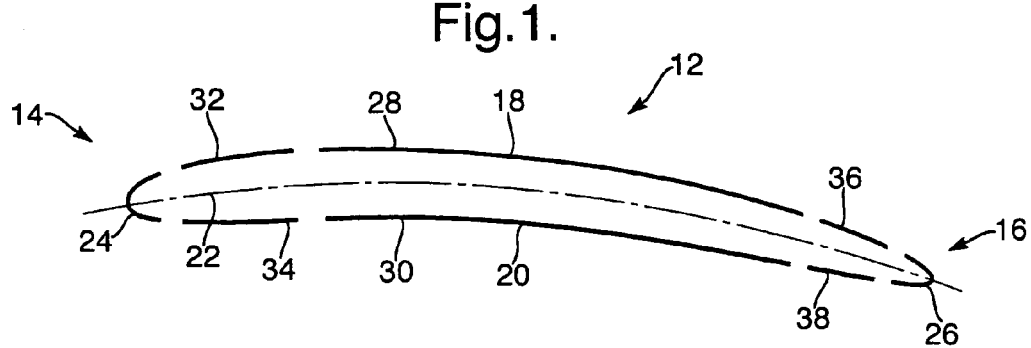
FIG. 1 is a plan view of part of a section through an aerofoil.

Referring first to FIG. 1, a section through an aerofoil 12 has a suction surface 18 and a pressure surface 20, extending between a leading edge 14 and a trailing edge 16. A centre line 22 may be defined through the aerofoil. It will be noted that the centre line 22 is curved—this is the normal situation for a real aerofoil. For simplicity, however, the centre line 22 is shown as a straight line in FIGS. 2 and 3 of this specification.

In order to characterise the surface profile of the aerofoil 12, the first step is to divide its surface into regions. In this drawing, the regions are shown slightly separated for clarity—in reality there would be no such separation. The "surface" may be the surface of an aerofoil object in a computer program, for example a CAD program, or it may be the physical surface of a real aerofoil.

The principal regions are a leading tip region 24 and a trailing tip region 26, and a suction surface flank region 28 and a pressure surface flank region 30. These regions are linked by transition regions, respectively a leading suction transition region 32 and a leading pressure transition region 34, and a trailing suction transition region 36 and a trailing pressure transition region 38.

The process of characterising the whole of the aerofoil surface, for this section through the aerofoil, is accomplished in four stages, each defining one tip region and one flank region, linked by the appropriate transition region. The four combinations to be considered are therefore: a) leading tip region 24, leading suction transition region 32, suction surface flank region 28; b) leading tip region 24, leading pressure transition region 34, pressure surface flank region 30; c) trailing tip region 26, trailing suction transition region 36, suction surface flank region 28; d) trailing tip region 26, trailing pressure transition region 38, pressure surface flank region 30.

Where the leading or trailing tip region is symmetrical, the suction and pressure surface may be treated together and only one set of calculations performed—a) and b) together or c) and d) together. On more complex shapes they will be calculated separately, and in these cases a blend may be required between the two tip surface shapes to avoid a disjoint when performing stress, thermal and aerodynamic modelling on the surface models.

For simple designs, the transition section may be incorporated into the tip or flank calculation, thus reducing the complexity of the calculation.

Figure 2:
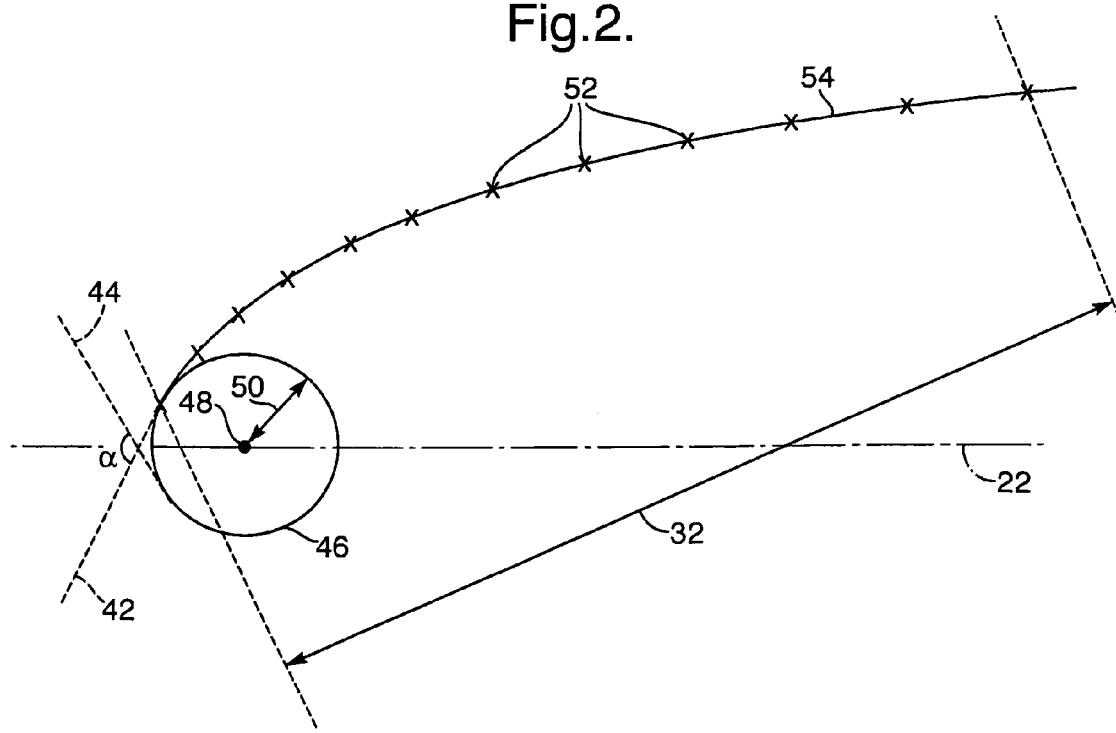
FIG. 2 is a plan view of the leading edge region of an aerofoil as in FIG. 1.

FIG. 2 shows the leading tip and transition regions of FIG. 1 in more detail. The tip shape is defined by the intersection of the two tangential intercepts 42, 44 to a circle 46 with centre 48 and radius 50. The intercepts 42, 44 intersect at an angle $\alpha$. Because in FIG. 2 the leading tip region is symmetrical, the intercepts 42, 44 intersect on the centre line 22. If the region were non-symmetrical, the circle defining the intercept 44 (corresponding to the pressure surface) would have a different centre and radius from the circle 46 defining the intercept 42, and the intersection may not coincide with the centre line 22.

A number of design points 52 are defined along the leading suction transition region 32. The spacing of the points 52 increases smoothly and monotonically with increasing distance from the aerofoil tip. This spacing serves two purposes.

Firstly, it places more points in the region of highest curvature, near to the tip, and fewer where the curvature is less, thereby increasing the accuracy of the modelling. Secondly, it avoids disjoints or step changes (particularly in the analysis or meshing) where the point spacing changes abruptly. A Bézier curve 54 is fitted to the points 52, characterising the surface profile of the leading suction transition region.

In the case of a physical aerofoil, the design points 52 will be measured using a suitable contact or non-contact measuring device. In the case of an object in a computer program, the measurements for the design points 52 will be derived from the definition of the object within the program.

FIG. 3 shows part of an aerofoil with a drooped tip. The droop of the tip is exaggerated in this drawing for emphasis. Such a tip is known to have aerodynamic benefits.

The centre 48 of the circle 46 is offset by a distance 62 from the blade centre line 22. Because of the drooped tip, it will be observed that the leading pressure transition region has curvature opposite to that in the aerofoils of FIGS. 1 and 2. One of the advantages of the invention is that such curvature can be more easily analysed and characterised by treating it separately.

This advantage is also apparent for certain specialised aerofoil geometries, for example where a groove or trough is provided in the aerofoil surface behind the leading edge. Examples of such geometry can be seen in European Patent application EP 1580399 A2.

The surface profile of the leading suction transition region 32 is characterised as described above. In the suction surface flank region 28, firstly a Bézier curve fit is performed on the selected design points 64, yielding a surface profile 66. Then, an adjustment referred to as a "fullness factor" is applied to the surface profile 66. The effect of this is to move the surface profile by an amount 68, variable along the length of the region 28, so that the final surface profile is as shown by the dashed line 70. It has been found that the use of this fullness factor, in conjunction with the Bézier curve fit, improves the performance of the aerofoil still further. It is particularly useful where there is an offset blade tip and where the ellipse fit is not of uniform ratio along the length of the tip edge. In these cases, it prevents instability in the modelled curve for the surface profile definition as well as having aerodynamic performance benefits.

The curve used to blend the leading suction transition region 32 into the suction surface flank region 28 is indicated by the dotted radius line 72, centred on the point B. This illustrates that the foci of such circular or elliptical curve fits may lie away from the aerofoil centre line 22, and may even lie outside the body of the aerofoil.

The same principles can be applied to analysing the suction surface trailing edge, pressure surface leading edge and pressure surface trailing edge portions of the blade. The fitted curves can be blended, where necessary, to ensure smooth transitions and machinability.

As described above, this method applies to a single "slice" or section through the aerofoil. The aerofoil cross-section may change along its length, and so the method can be repeated, as many times as desired, for sections along the length of the aerofoil.

The lengthwise profile of the aerofoil may therefore be characterised in a similar manner, using curve fits to avoid step changes. Where particular regions of the aerofoil are optimised for particular duties, the aerofoil profile may appear to have steps in it, for example separating the root area, mid-blade area and tip area. These steps arise from the optimisation of each part of the blade for its intended purpose.

In this manner, a characterisation of the whole aerofoil surface is possible, in a form that is usable directly in design, analysis and manufacturing tools, and in which the mathematical complexity of the characterisation is minimised (thereby optimising the speed of analysis) while still retaining the required definition of critical features (thereby ensuring that the manufactured component accurately reproduces the design intent).

It will be appreciated that the claimed method may be applied to other components besides the aerofoils described, and that modifications may be made to it, without departing from the spirit and scope of the invention.

For example, the method described is suitable for use with compressor or turbine aerofoils in gas turbine engines, as well as in any other component having the form of an aerofoil or hydrofoil (this term being used to distinguish an aerofoil operating in water or in any fluid other than air). Some examples of these categories of components are splitters, struts, fairings and pylons in gas turbine engines; windmills or wind turbines; propeller blades for ships; components of water jets or propulsors.

For instance, in designing a hydrofoil, the Reynolds number in the analysis changes from that for air to that for water, and due to the properties of water the design speeds, angle of attack, and strength requirements will change. The principle of defining the surface remains largely unchanged though the shape will be different.

Where there are mixtures of fluids, as in a steam turbine, the analysis may be done using an average fluid density or by treating the two (or more) phases of the fluid (e.g. water and air) separately. In this case the resultant shape will be a blade with a leading edge similar to that shown in FIG. 3 but a much shorter blade with a more abrupt trailing edge. In this case the Bézier fit still works, but the transition length will need to be different because the flank has more curvature.

The method could advantageously be applied to other components where design, analysis and manufacture need to be integrated and performed quickly, such as precision bespoke tooling. Such tooling is used, for example, for casting, moulding, pressing and extruding. For example, for extrusion press tooling the fluid flow (e.g. aluminium or molten plastic) needs to be modelled as part of the tool design, taking account of the temperature and stress effects on the tool. Extrusion press load capacities range from a few hundred tonnes to as high as 20,000 tonnes. Billet sizes cover the range from 50 mm diameter to 500 mm with length usually about 2-4 times the diameter and while most presses have cylindrical containers a few have rectangular ones for the production of wide shallow sections. There are several extrusion methods in which such tooling may be used.

Co-extrusion is where multiple layers are extruded together. It is used widely in sheet, film, and tubular extrusion applications.

Cold-working extrusion processes are performed at or near room temperature. High stresses require robust tooling. Because cold-working is a strengthening process, the worked material is not subject to the same levels of oxidation inherent in the thermal cycling associated with hot extrusion. Cold extrusion is suitable for tubing, gear blanks, window frames, etc.

Dual extrusion and multi-durometer extrusion are techniques in which materials of different hardnesses are combined in a single extrusion. A common application is the combination of a rigid material with a flexible material in one cross-section. The rigid component adds strength and structural alignment, while the flexible component may have a function such as sealing. Variations can include combining materials of different colours, and laminates with varying layer properties.

Hot-working extrusion operates at elevated temperatures, enabling changes of shape to be achieved in a single operation. Very complex sections can be produced that are not achievable with other shaping techniques. In hot extrusion, a metal billet heated to the appropriate temperature is fed into the cylindrical container of the extrusion press and is forced by the action of a ram through a hard (steel) die whose orifice has the desired shape to produce the solid or hollow section. The metal emerges from the die as a continuous bar, tube or section, which is cut to the required lengths. Hot Extrusion products are therefore essentially "linear" in character, in the sense that shaping is confined to the cross section only.

Impact extrusion is a technique in which a small amount of material is forced through a die by a ram, often in a tubular or similar cross-section. Very significant material deformation makes this process suitable for relatively soft materials such as aluminium, lead, or tin. One application of impact extrusion is for collapsible tubular sections, cans or toothpaste tubes.

Hydrostatic extrusion is similar to impact extrusion, but relies on a more gradual ram application than the impact extrusion technique.

Reverse or backwards extrusion is a technique in which the material blank is forced to flow in the direction opposite the extruding pin, plunger, or ram. It may be combined with impact or hydrostatic extruding. This process is used for cans or collapsible tubes.

The claimed method of surface characterisation, applicable in design, analysis and manufacture control, may be used for tooling for any of these techniques but is particularly appropriate for cold-working extrusion, where the tooling (die) stresses are high.

The method is also particularly suited to calculating the stress and curvatures required for multi-layer heavy press tooling. In multi-layer press tooling each layer is heated and shrunk onto its predecessor to create a highly stress dense core. In the final layers, careful attention must be paid to the corners as these have to be shaped correctly to produce the component required, but not be so stressed that on first use a crack initiates from the edge, nor from the corner of the component created by the pressing. The claimed method, which characterises the design surface and quickly allows a stress and thermal calculation to be made, is very useful in producing a first pass for the tooling design. A more detailed (and therefore taking longer) analysis may be used to complete the fine detail of the design. In many cases the initial definition can be used to control the manufacture of both halves of the press tool.

In applying the claimed method to such components, a first region would be defined near to a corner of the press tool, with an adjacent transition region and a second region more remote from the corner. These regions are analogous to the tip, transition and flank regions described above in connection with the aerofoil.

The spacing of the design points 52 may be varied in any convenient way. For example, the spacing may be varied according to a mathematical series such as an arithmetic or geometric progression or the Fibonacci series.

Although a Bézier curve fit has been found to be particularly suitable for this method, alternative curve-fitting methods may be substituted, such as the use of French curves, polynomials, least-squares, etc.

The fullness factor may be applied only to one region of the surface, for example to the transition region as in the embodiment described; or it may be applied across a larger part of the surface, so as to bridge two or more regions.

The invention claimed is:

1. A method for characterising a profile of a surface of an aerofoil, the method comprising:
    a) dividing the surface into a plurality of regions, including at least a leading tip region, a suction surface flank region, a pressure surface flank region and a trailing tip region, adjacent regions being linked by transition regions;
    b) defining a plurality of stages, each stage comprising a pair of adjacent regions and their corresponding transition region;
    c) for each region of a stage, measuring the surface and selecting a number of measured points to define a co-ordinate dataset for that stage;
    d) for each stage, applying a curve-fitting algorithm to the dataset for the stage to characterise the profile of the stage; and
    wherein at least one of the preceding steps is performed by a computer
    e) combining the characterised stage profiles so as to characterise the profile of the surface.

2. The method of claim 1, in which the tip regions have relatively high curvature, and relatively low curvature.

3. The method of claim 1, in which in step c) a Bézier curve is fitted to at least one dataset.

4. The method of claim 1, in which in step c) a French curve is fitted to at least one dataset.

5. The method of claim 1, in which in step b) the spacing of the measured points varies.

6. The method of claim 5, in which the spacing is smaller where the curvature is greater.

7. The method of claim 5, in which the spacing of the measured points increases smoothly and monotonically, along at least a major part of the surface.

8. The method of claim 5, in which the spacing of the measured points varies in accordance with a mathematical series.

9. The method of claim 1, in which in step c) the curve-fitting algorithm includes adding a fullness factor to the curve, in at least one of the regions.

10. The method of claim 9, in which the fullness factor is applied over, and bridges, more than one region.

11. The method of claim 1, in which the aerofoil is part of a rotor blade or stator vane for a compressor or turbine of a gas turbine engine.

12. A method for characterising a profile of a surface of an aerofoil, the method comprising:
    characterizing profiles of a pressure surface and of a suction surface of the aerofoil, both adjacent to a tip of the aerofoil, using the method of claim 1; and
    combining the characterised profiles so as to give a smooth transition over the aerofoil tip.

13. The method of claim 1, wherein at least one region is defined by an intersection of at least two lines that are tangential to a circle, the circle having a radius that is disposed at least in part within the component.

\* \* \* \* \*